United States Patent
Goss et al.

(10) Patent No.: US 12,270,737 B2
(45) Date of Patent: Apr. 8, 2025

(54) HIGH ASPECT RATIO VACUUM AIR SAMPLING ASSEMBLY

(71) Applicant: RESTEK CORPORATION, Bellefonte, PA (US)

(72) Inventors: Michael A. Goss, Bellefonte, PA (US); Jason S. Herrington, Centre Hall, PA (US); Thomas E. Kane, Bellefonte, PA (US)

(73) Assignee: RESTEK CORPORATION, Bellefonte, PA (US)

( * ) Notice: Subject to any disclaimer, the term of this patent is extended or adjusted under 35 U.S.C. 154(b) by 372 days.

(21) Appl. No.: 17/996,181

(22) PCT Filed: Apr. 22, 2021

(86) PCT No.: PCT/US2021/028591
§ 371 (c)(1),
(2) Date: Oct. 13, 2022

(87) PCT Pub. No.: WO2021/216837
PCT Pub. Date: Oct. 28, 2021

(65) Prior Publication Data
US 2023/0194393 A1    Jun. 22, 2023

Related U.S. Application Data

(60) Provisional application No. 63/013,858, filed on Apr. 22, 2020.

(51) Int. Cl.
*G01N 1/22* (2006.01)
*F17C 1/00* (2006.01)
*G01N 1/24* (2006.01)

(52) U.S. Cl.
CPC ............ *G01N 1/2273* (2013.01); *F17C 1/005* (2013.01); *G01N 1/24* (2013.01);
(Continued)

(58) Field of Classification Search
CPC ............ G01N 1/2273; G01N 2001/248; F17C 2221/031; F17C 2223/0123;
(Continued)

(56) References Cited

U.S. PATENT DOCUMENTS

| 1,350,666 | A | * | 8/1920 | Murphy | .................... F17C 1/06 220/591 |
| 5,429,268 | A | * | 7/1995 | Hale | ......................... F17C 1/00 220/582 |

(Continued)

FOREIGN PATENT DOCUMENTS

| WO | 2019237095 A3 | 12/2019 | |
| WO | WO-2019237095 A2 * | 12/2019 | ........... G01N 1/2294 |

OTHER PUBLICATIONS

Conductance of a Tube; Tech Tips; Catalog p. 4; www.duniway. com, (first known date of posting Aug. 29, 2020 for equivalent document https://www.duniway.com/images/_pg/conductance-of-tube.pdf at Internet Archive "wayback machine").
The RAVE Family of Air Sampling Valves: Excellence is Our Standard; RESTEK Pure Chromatography; Lit. Cat. #EVSS2105D-UNV; www.restek.com, 2020.
EPA/625/R-96/010b Compendium of Methods for the Determination of Toxic Compounds in Ambient Air; Second Edition; Jan. 1999.

*Primary Examiner* — Nathaniel J Kolb
(74) *Attorney, Agent, or Firm* — McNees Wallace & Nurick LLC

(57) ABSTRACT

A high aspect ratio vacuum air sampling assembly is disclosed including a first canister module. The canister module includes a high aspect ratio conduit having an aspect ratio of at least 30:1, an inlet disposed at an inlet end of the conduit, and an outlet with an outlet valve disposed at an outlet end of the conduit. The outlet is in fluid communication with the inlet through an internal volume of the conduit. An air sampling train is attached to and in fluid communication with the inlet, and includes an inlet valve, a precision orifice, and a flow controller. The inlet valve and the outlet valve are configured to isolate the internal volume of the conduit from fluid communication with an external environment when the (Continued)

inlet valve and the outlet valve are closed. The assembly may further include a second canister module or more in sequence.

16 Claims, 10 Drawing Sheets

(52) U.S. Cl.
  CPC .................. *F17C 2201/056* (2013.01); *F17C 2205/0146* (2013.01); *F17C 2205/0323* (2013.01); *F17C 2223/0123* (2013.01); *F17C 2223/03* (2013.01)

(58) Field of Classification Search
  CPC .......... F17C 2223/038; F17C 2201/056; F17C 2205/0323
  See application file for complete search history.

(56) References Cited

U.S. PATENT DOCUMENTS

| | | | |
|---|---|---|---|
| 9,588,023 B2* | 3/2017 | Coleman | G01N 33/0044 |
| 2012/0234114 A1* | 9/2012 | Coleman | G01N 31/224 |
| | | | 73/864.63 |
| 2014/0004552 A1 | 1/2014 | Favuzzi et al. | |
| 2015/0316207 A1* | 11/2015 | Laney | F17C 1/00 |
| | | | 427/236 |
| 2020/0355580 A1* | 11/2020 | Asher | G01N 33/0004 |
| 2022/0412510 A1* | 12/2022 | Tatsushima | F17C 1/06 |

\* cited by examiner

HIGH ASPECT RATIO VACUUM AIR SAMPLING ASSEMBLY

RELATED APPLICATIONS

This application claims the benefit of and priority to U.S. Provisional Patent Application No. 63/013,858, filed Apr. 22, 2020, entitled "High Aspect Ratio Vacuum Canisters," which is hereby incorporated by reference in its entirety.

FIELD OF THE INVENTION

This application is directed to high aspect ratio vacuum air sampling assemblies. More specifically, this application is directed to high aspect ratio vacuum air sampling assemblies having high aspect ratio conduit with an aspect ratio of at least 30:1 as the canister vessel.

BACKGROUND OF THE INVENTION

Metal canisters are frequently used to collect whole air samples for subsequent analysis in a laboratory. Standard examples of whole air sampling methods include EPA/625/R-96/010b "Compendium of Methods for the Determination of Toxic Compounds in Ambient Air; Second Edition; Compendium Method TO-15; Determination of Volatile Organic Compounds (VOCs) In Air Collected In Specially-Prepared Canisters And Analyzed by Gas Chromatography/Mass Spectrometry (GC/MS)." As disclosed therein, typically, a sample of air is drawn through a sampling train comprised of components that regulate the rate and duration of sampling into a pre-evacuated and passivated chamber.

In preparation for use of a canister suitable for EPA whole air sampling applications, the canister is evacuated, and the resulting vacuum is employed to collect the sample of air. The volume of the canister generally ranges from about 50 milliliters to about 15 liters depending on the test requirements. The canister may be made from any inert material, most commonly stainless steel, glass, aluminum, or chemically treated or coated versions of the same.

Canisters are most commonly designed to: (1) minimize the surface area-to-volume ratio of the canister, thereby reducing the surface area available to adversely interact with the air sample; and (2) maximize the mechanical strength of the canister, thereby providing resistance to crushing or wall failure of the canister while under vacuum. The most common shapes for a canister are therefore a sphere or cylinder with the material of the canister being selected to have strength sufficient to withstand the vacuum pressure.

The aspect ratio of any shape is given as the ratio between the shape's length to the shape's height of the object (to maintain consistency with the EPA standard EPA/625/R-96/010b, dimensions of length for vacuum vessels are provided in inches, and dimensions of volume are provided in $cm^3$ or mL). For cylinders and tubing, the inner diameter of cylindrical vessels is employed as the width. Because the canister is evacuated, the design must be rigid enough to prevent spontaneous crushing. Standard vessel designs for vacuum canisters emphasize very low aspect ratios in order to increase the structural rigidity and reduce the inner surface area of the vessel. The next preferred shape after a sphere is a cylinder, with the long dimension of the cylinder being curved and the short ends being either curved or flat. This shape is commonly employed for vacuum and pressurized gas applications due to its structural rigidity. Laboratory lecture bottles represent the vessel technology applied to vacuum canisters. Their dimensions are typically 12-18 inches (300-460 mm) long and 1-3 inches (25-76 mm) in diameter. These dimensions generally cover the 500-2,000 mL volume range. The aspect ratio for these vessels reaches 18 (18 inch length/1 inch diameter (460 mm/25 mm)). The general range of aspect ratios for current 0.4-2 L air canisters generally ranges between 1 (spheres) and 20.

Canisters are commercially available from multiple suppliers. Canisters made from stainless steel represent the most rugged of the available materials; however, they are expensive to manufacture due in part to the cost of fabricating the most common shapes (spherical and cylindrical) having a very narrow stem diameter. In cases where the vessel is spherical, manufacturing practices generally include first fabricating two half spheres which are subsequently welded together. In cases where the metal vessels are then treated to create an inert inner surface (e.g., silica and silicon coatings), the successive preparation steps including electropolishing and chemical rinses are particularly cumbersome.

Control of the flow of air into the canister is achieved using the sampling train. The sampling train of a standard canister comprises a shutoff valve, a flow controller, and a pressure gauge. Additional elements frequently employed include additional valves, inlet filters, frits, and curved tubing designed to prevent rainwater from entering the train (tubing "candy-canes").

Valve designs vary in their construction. All designs must provide a leak-tight seal when closed and a wetted flow path that does not influence the chemical composition of the sampled air. Examples of commercially available valves from several suppliers include needle valves, diaphragm seal valves, and ball valves. One valve design of particular note is a two-part, quick-connect, self-sealing valve. Quick-connect air valves have mated pairs of valves (i.e., one male and one female) that operate on the principle that when the two elements of the mated pair are disconnected, the seals within each are closed. Connecting the mated pairs opens the seals in each valve, establishing fluid communication between the valves. In this manner, quick-connect air valves serve both as a means of connecting two devices and also as the valve that permits flow into or out of the devices being connected. Quick connect valve assemblies are commercially available from several suppliers.

The flow of air into the canister is driven by the pressure drop between the exterior (1 atmosphere (14.7 psi) at sea level) and the vacuum of the canister (0 psi). The sampling train is employed to provide a constant flow of air sample to the canister.

The flow controller commonly employs a critical orifice which acts as a flow restrictor upstream of constant back pressure. As the canister fills, the pressure in the canister increases. In some cases, a second device is employed in conjunction with the critical orifice, which is capable of dynamically controlling gas flow over time to accommodate the increase in pressure as the canister fills. The Veriflo SC423XL Precision Low Flow Controller, available from Restek Corporation, is an example of a device employed to maintain consistent sampling flow over time. In other cases where the sampling rate is comparably fast, e.g., immediate, or "grab" sampling, (i.e., sample times of about 0.25-3 minutes), a fixed precision critical orifice is employed. In some cases with grab samples where the maximum flow rate is desired, no restriction orifice is employed, and the flow is set by the cumulative inner dimensions of the remaining sample train elements. As disclosed in "The RAVE Family of Air Sampling Values: Excellence is Our Standard" (2020), sample time depend on the canister volume and critical orifice internal diameter, as reproduced, in part, in Table. 1.

TABLE 1

Sample Time Based on Critical Orifice Internal Diameter and Canister Volume

| Canister Volume/Sampling Time | | | | | Flow | |
|---|---|---|---|---|---|---|
| 400 mL | 1 L | 3 L | 6 L | 15 L | (full vacuum) | Orifice Size |
| 8 hr | 24 hr | 48 hr | 125 hr | | 0.5-2 mL/min | 0.0008 in |
| 2 hr | 4 hr | 12 hr | 24 hr | 60 hr | 2-4 mL/min | 0.0012 in |
| 1 hr | 2 hr | 6 hr | 12 hr | 30 hr | 4-8 mL/min | 0.0016 in |
| | 1 hr | 4 hr | 8 hr | 20 hr | 8-15 mL/min | 0.0020 in |
| | | 2 hr | 3 hr | 8 hr | 15-30 mL/min | 0.0030 in |
| | | 1 hr | 1.5 hr | 4 hr | 30-80 mL/min | 0.0060 in |
| | | | 1 hr | 1 hr | 80-340 mL/min | 0.0090 in |

The canister is delivered to the sampling site under vacuum. At least one shutoff valve is employed in the sampling train to ensure a leak tight seal prior to canister use. The valve is most commonly positioned between the flow controller and the vacuum canister. Additional valves may be positioned between the ambient air inlet and the flow controller.

When the canister is positioned at the desired location, the flow path is opened to the canister vacuum and the flow rate into the canister is maintained at a constant rate to allow sampling over the desired duration. After the desired sampling duration has elapsed, the canister shutoff valve is closed, and the canister is collected. Chemical analysis of the contents is later performed by gas chromatography in a laboratory, wherein sample aliquots are taken from the canister for testing. In the case of a standard 6 L can, as many as four aliquots may be taken in succession. Because the canister is a rigid body, the pressure of the remaining gas in the canister is lower with every aliquot taken. In some cases, the later aliquots may first require repressurization of the canister using an inert gas in order to remove the remaining sample. This in turn requires additional calculations regarding those later analysis results as compared to earlier aliquots.

In some cases, a second canister ("duplicate sampling") is employed during the same air sampling event. For individual canisters, can-to-can sampling variability may be prohibitively high, partly due to mechanical variability between two discreet sampling systems, as well as the separate locations of two discreet sampling inlets. In cases where the ambient air is particularly heterogenous (e.g., the presence of smoke plumes in the ambient air), even two cans positioned immediately side-by-side may result in sufficiently different air sampling. In cases where duplicate sampling is required, a manifold assembly may be employed. The manifold provides a single sampling source to two discreet canisters. The design requires an equivalent sample path from the inlet to each of the canister outlets. Two canisters may be sampled in parallel using a manifold assembly with a single sampling train. In most common configurations, a single sample train is employed between the inlet and the T-splitter. Alternatively, two separate sample trains may be used, each positioned between the T-splitter and each canister inlet respectively. Compared to using two discreet canisters, the manifold accessory results in a very bulky assembly having poor resistance to deformation under the respective weights of the canisters, which results in an assembly more prone to leaking.

After use, canisters must be cleaned particularly to remove chemical compounds from the previous use that are adhered to the inner surface. Cleaning the canisters involves successive fill-and-empty steps employing humid gases in order to remove any trace chemical compounds. This cleaning regimen relies on a continuous dilution mechanism to eliminate surface adsorbed contaminants. It is well known in the art that cleaning regimens employing a sweep-flow design are more effective (e.g., clean solvent or gas is introduced at one end, and the subsequent rinsate is eliminated through a downstream outlet). Canisters with low aspect ratio shapes such as spheres or large diameter cylinders, combined with a single narrow bore inlet, inhibit any effective sweeping flow or other means to clean the canisters in a continuous flow configuration.

Exemplary singular and double canister configurations known in the art are depicted in FIGS. 1 and 2 for reference.

BRIEF DESCRIPTION OF THE INVENTION

In one exemplary embodiment, a high aspect ratio vacuum air sampling assembly includes a first canister module. The first canister module includes a first high aspect ratio conduit having an aspect ratio of at least 30:1, a first inlet disposed at a first inlet end of the first high aspect ratio conduit, and a first outlet disposed at a first outlet end of the first high aspect ratio conduit. The first outlet is in fluid communication with the first inlet through a first internal volume of the first high aspect ratio conduit. A first outlet valve is attached to and in fluid communication with the first outlet. An air sampling train is attached to and in fluid communication with the first inlet. The air sampling train includes a first inlet valve in fluid communication with the first inlet, a precision orifice, and a flow controller. The first inlet valve and the first outlet valve are configured to isolate the first internal volume of the first high aspect ratio conduit from fluid communication with an external environment when the first inlet valve and the first outlet valve are closed.

In another exemplary embodiment, a high aspect ratio vacuum air sampling assembly includes a first canister module and a second canister module. The first canister module includes a first high aspect ratio conduit having an aspect ratio of at least 30. A first portion of the first high aspect ratio conduit constituting at least 50% of a length of the first high aspect ratio conduit is disposed in a first coil, defining a first coiled portion of the first high aspect ratio conduit. A first inlet is disposed at a first inlet end of the first high aspect ratio conduit. A first outlet is disposed at a first outlet end of the first high aspect ratio conduit. The first outlet is in fluid communication with the first inlet through a first internal volume of the first high aspect ratio conduit. A first outlet valve is attached to and in fluid communication with the first outlet. An air sampling train is attached to and in fluid communication with the first inlet. The air sampling train includes a precision orifice and a first inlet valve in fluid communication with the first inlet. The first inlet valve and the first outlet valve are configured to isolate the first internal volume of the first high aspect ratio conduit from fluid communication with an external environment when the first inlet valve and the first outlet valve are closed. The second canister module includes a second high aspect ratio conduit having an aspect ratio of at least 30:1. A second portion of the second high aspect ratio conduit constituting at least 50% of a length of the second high aspect ratio conduit is disposed in a second coil, defining a second coiled portion of the second high aspect ratio conduit. A second inlet is disposed at a second inlet end of the second high aspect ratio conduit. A second inlet valve is attached to and in fluid communication with the second inlet. A second outlet is disposed at a second outlet end of the second high aspect ratio conduit. The second outlet is in fluid communication with the second inlet through a second internal volume of the second high aspect ratio conduit. A second outlet valve is attached to and in fluid communication with the second outlet. The second inlet valve and the second outlet valve are configured to isolate the second internal volume of the second high aspect ratio conduit from fluid communication with the external environment when the second inlet valve and the second outlet valve are closed. The second inlet valve is configured to attach to the first outlet valve via a first union disposed between the first outlet valve and the second inlet valve such that when the first outlet valve and the second inlet valve are open, the second internal volume is in fluid communication with the first internal volume.

BRIEF DESCRIPTION OF THE DRAWINGS

Wherever possible, the same reference numbers will be used throughout the drawings to represent the same parts.

DETAILED DESCRIPTION OF THE INVENTION

Disclosed herein are high aspect ratio vacuum air sampling assemblies. High aspect ratio vacuum air sampling assemblies in comparison to low aspect and medium aspect ratio vacuum air sampling assemblies, increase sample homogeneity and reduce persistent contamination of sampling vessels. In particular, it is noted that conduit such as tubing is comparatively cheaper than commercial spherical vessel designs, maintains a structure rigid enough for vacuum conditions, and provides a straight-through flight path through the vacuum canister. Having an inlet and outlet at opposing ends of a conduit promotes sweep-flow cleaning practices and simplifies chemical treatments of the interior during manufacture.

As used herein, "low aspect ratio" indicates a ratio up to 5:1, "medium aspect ratio" indicates a ratio greater than 5:1 and less than 30:1, and "high aspect ratio" indicates a ratio of at least 30:1.

Figure 1:
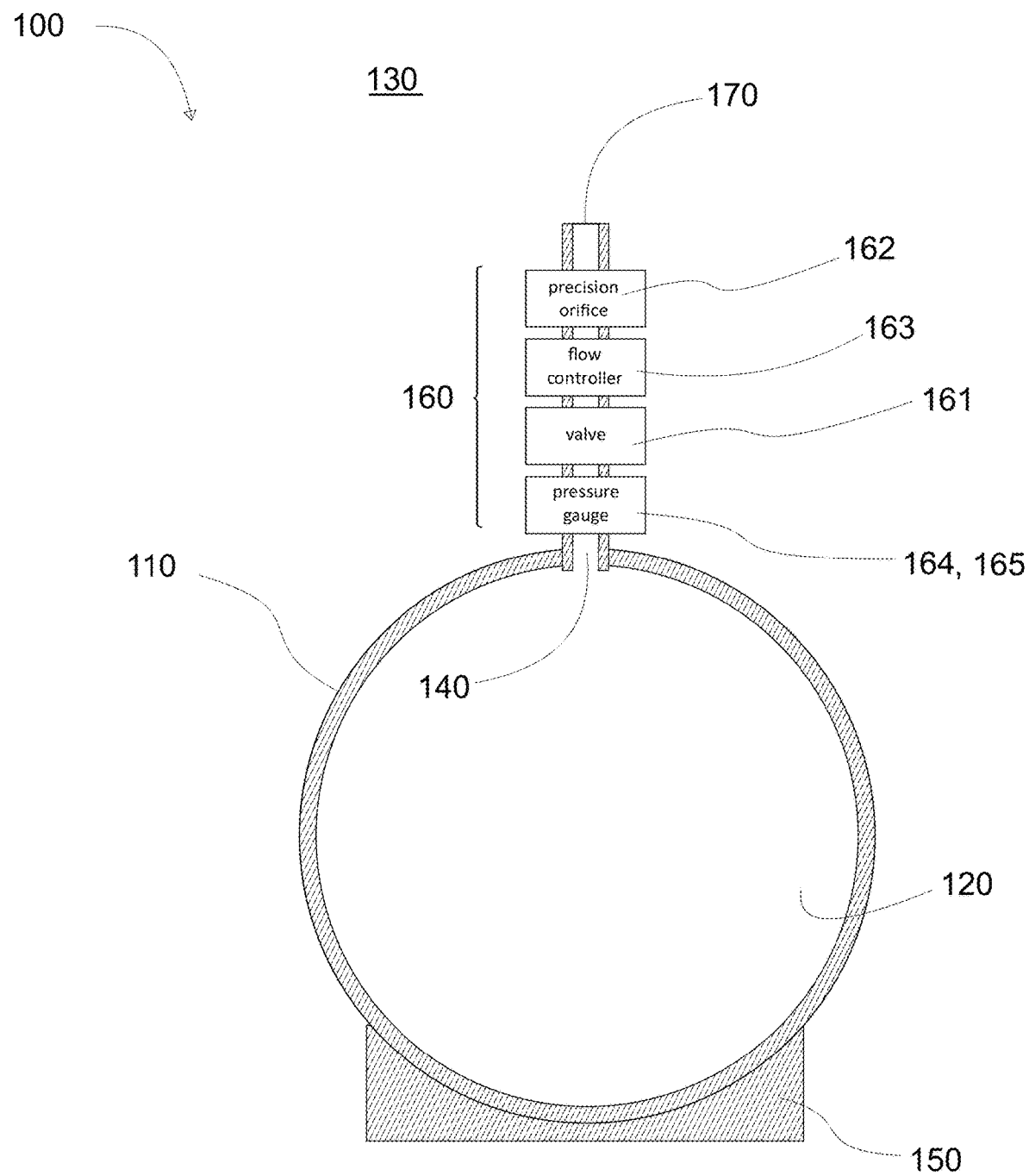
FIG. 1 is a schematic view of a whole air gas sampling canister, corresponding to canisters known in the art.

Referring to FIG. 1, in known vacuum air sampling assemblies 100, a first canister 110 includes a first internal volume 120 which is in fluid communication with an external environment 130 through a first inlet 140. The first canister 110 may be supported by a stand 150. An air sampling train 160 is attached to the first inlet 140 and includes a first inlet valve 161 (which is also a first air sampling train valve 165), a precision orifice 162, a flow controller 163, and a pressure gauge 164. As used herein, a "precision orifice" indicates an aperture of predetermined fixed dimension which functions as a flow restrictor and regulates the rate of air sampling, and "flow controller" indicates a device with a variable aperture that adjusts relative to a pressure differential between the first internal volume 120 and the external environment 130 so as to provide an essentially constant air sampling flow rate ("essentially" indicating an acceptable deviation of up to 10%). Fluid enters the air sampling train 160 from the external environment 130 through an inlet stem 170.

Figure 2:
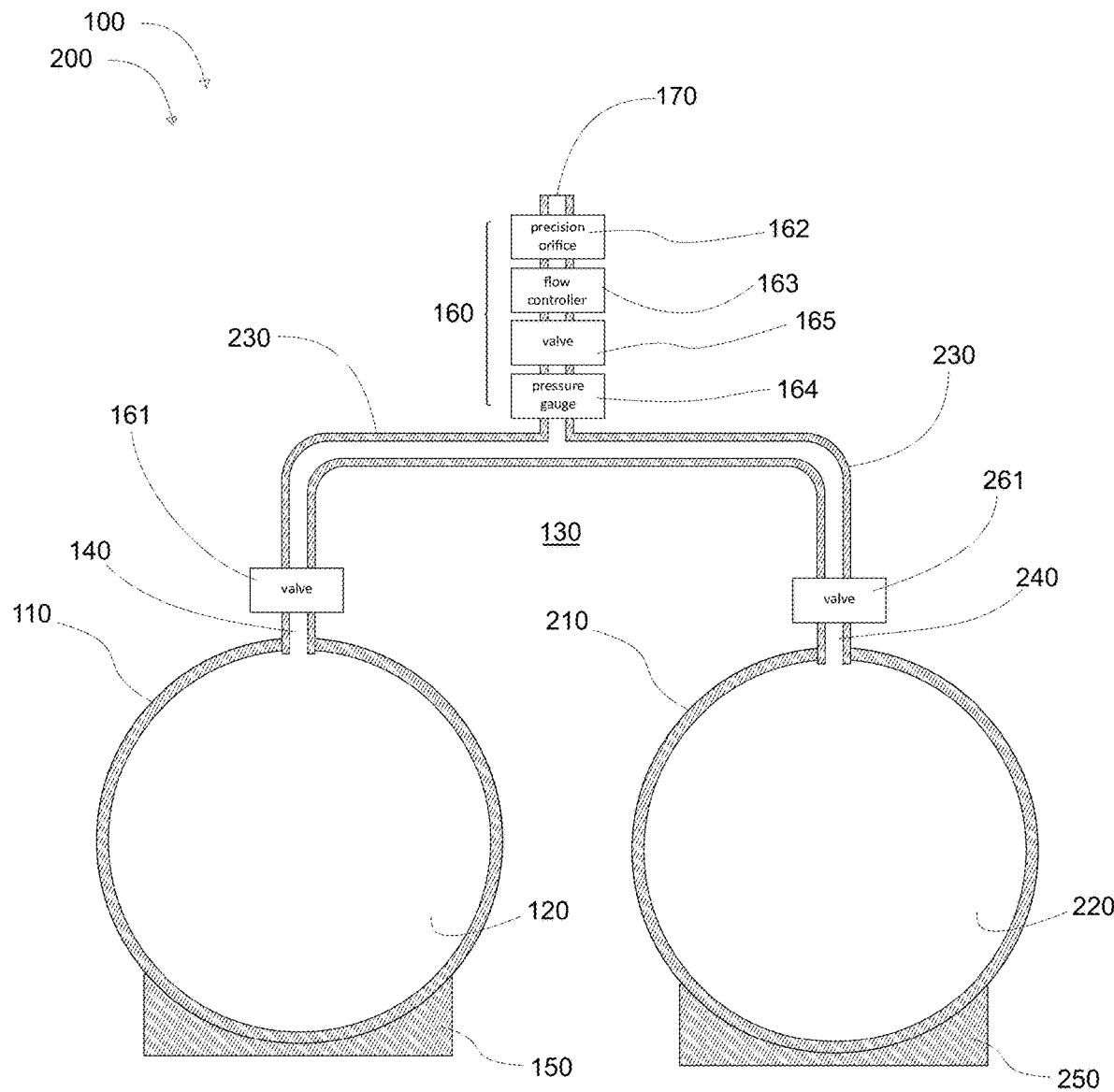
FIG. 2 is a schematic view of a parallel sampling two canister whole air gas sampling canister apparatus, corresponding to parallel sampling two canister whole air gas sampling canisters known in the art.

Referring to FIG. 2, in known vacuum air sampling assemblies 100 which are double-canister vacuum air assemblies 200, a first canister 110 includes a first internal volume 120 which is in fluid communication with an external environment 130 through a first inlet 140. The first canister 110 may be supported by a stand 150, and a second canister 210 includes a second internal volume 220 which is in fluid communication with the external environment 130 through a second inlet 240. The second canister 210 may be supported by a stand 250. A first inlet valve 161 is attached to the first inlet 140, and a second inlet valve 261 is attached to the second inlet 240. A manifold 230 connects the first inlet valve 161 and the second inlet valve 261 to an air sampling train 160, and the air sampling train 160 includes a first air sampling train valve 165, a precision orifice 162, a flow controller 163, and a pressure gauge 164. The manifold 230 is not designed to retain a useful sample, as the first inlet valve 161 and the second inlet valve 261 are disposed for sealing the first internal volume 120 and the second internal volume 220, respectively, and the manifold 230 lacks independent outlet valves for isolating the internal volume of the manifold when the first canister 110 and the second canister 210 are disconnected therefrom. Fluid enters the air sampling train 160 from the external environment 130 through an inlet stem 170.

Figure 3:
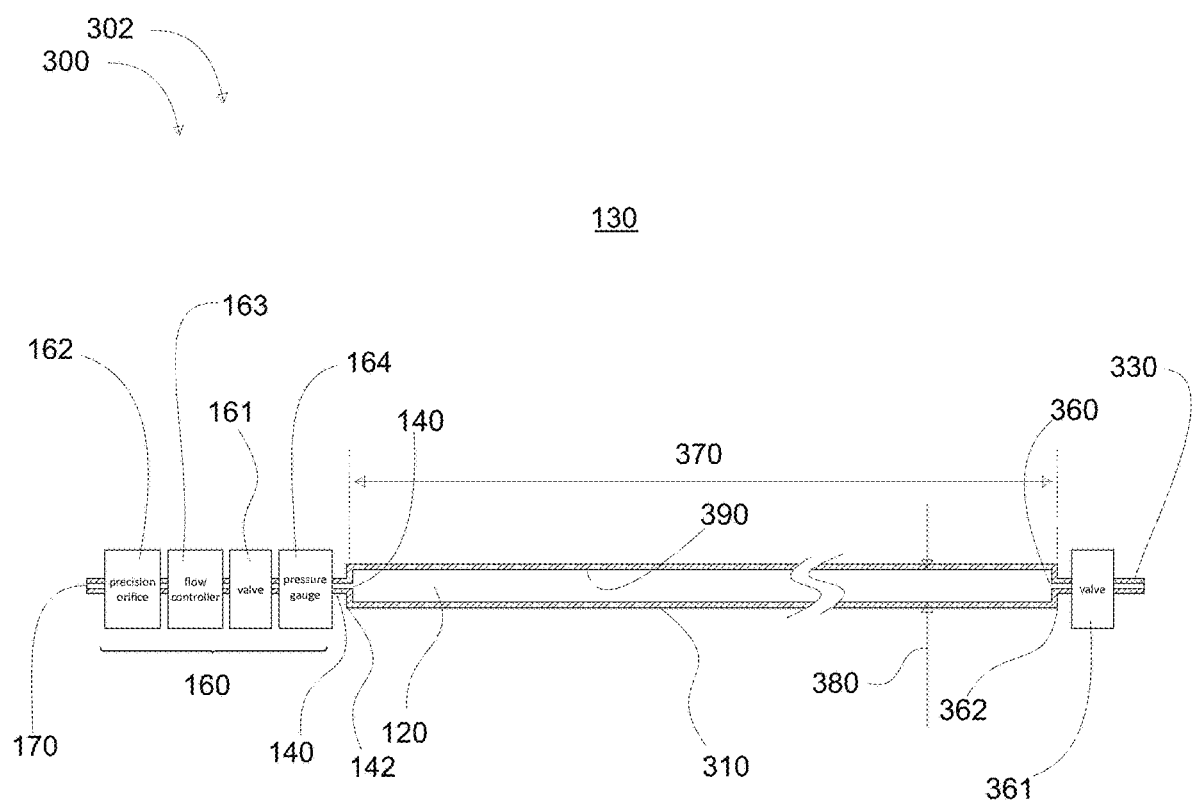
FIG. 3 is a schematic view of a high aspect ratio vacuum air sampling assembly, according to an embodiment of the present disclosure.

Referring to FIG. 3, in one exemplary embodiment, a high aspect ratio vacuum air sampling assembly 300 includes a first canister module 302. The first canister module 302 includes a first high aspect ratio conduit 310 having an aspect ratio of at least 30:1 (measured by the length 370 along the first high aspect ratio conduit 310 versus the (inner) diameter 380 of first high aspect ratio conduit 310), a first inlet 140 disposed at a first inlet end 142 of the first high aspect ratio conduit 310, and a first outlet 360 disposed at a first outlet end 362 of the first high aspect ratio conduit 310. The first outlet 360 is in fluid communication with the first inlet 140 through a first internal volume 120 of the first high aspect ratio conduit 310. A first outlet valve 361 is attached to and in fluid communication with the first outlet 360. An air sampling train 160 is attached to and in fluid communication with the first inlet 140. The air sampling train 160 includes a first inlet valve 161 in fluid communication with the first inlet 140, a precision orifice 162, and, optionally, a flow controller 163. The first inlet valve 161 and the first outlet valve 361 are configured to isolate the first internal volume 120 of the first high aspect ratio conduit 310 from fluid communication with an external environment 130 when the first inlet valve 161 and the first outlet valve 361 are closed. Fluid enters the air sampling train 160 from the external environment 130 through an inlet stem 170 and exits the first outlet valve 361 through a first outlet stem 330. This fluid flow may be reversed.

The first internal volume 120 of the first high aspect ratio conduit 310 may be disposed under any suitable vacuum, including, but not limited to, a vacuum with a pressure of less than 1 psi (6.9 kPa), alternatively less than 0.5 psi (3.4 kPa), alternatively less than 0.1 psi (0.7 kPa), alternatively less than 0.01 psi (0.07 kPa), alternatively less than 0.001 psi (0.007 kPa).

The aspect ratio of the first high aspect ratio conduit 310 may be any suitable aspect ratio of at least 30:1, including, but not limited to, at least 40:1, at least 50:1, at least 75:1, at least 100:1, or any sub-range or combination thereof.

The first high aspect ratio conduit 310 may have any suitable cross-sectional conformation along its length 370, including, but not limited to, an essentially circular or essentially elliptical cross-sectional conformation in which case the first high aspect ratio conduit 310 may be characterized as being a first tube. Tubing with an outer diameter greater than 0.25 inches (6.4 mm) may include reducing stems on the first inlet 140 and the first outlet 360 to accommodate the sampling train 160 and canister cleaning devices. In an alternative embodiment, the cross-sectional conformation may be triangular, rectangular, square, pentagonal, hexagonal, or any other suitable shape or combination thereof, specifically including versions of the aforementioned shapes with rounded corners.

The first high aspect ratio conduit 310 may be formed of any suitable material, including, but not limited to, metals, glasses, quartz, polymers, or combinations thereof. A first internal surface 390 of the first high aspect ratio conduit 310 may be bare or may be coated or chemically treated so as to reduce chemical interactions with sample analytes relative to an otherwise identical internal surface which has not been so coated or chemically treated.

The first high aspect ratio conduit may have any suitable average inner diameter 380, including, but not limited to, an average inner diameter 380 of 0.1-3.5 inches (2.5-89 mm), alternatively 0.18-3.0 inches (4.6-76 mm), alternatively 0.18-0.5 inches (4.6-13 mm), alternatively 0.25-0.75 inches (6.4-19 mm), alternatively 0.5-1.0 inches (13-25 mm), alternatively 0.75-1.25 inches (19-32 mm), alternatively 1.0-1.5 inches (25-38 mm), alternatively 1.25-1.75 inches (32-44 mm), alternatively 1.5-2.0 inches (38-51 mm), alternatively 1.75-2.25 inches (44-57 mm), alternatively 2.0-2.5 inches (51-64 mm), alternatively 2.25-2.75 inches (57-70 mm), alternatively 2.5-3.0 inches (64-76 mm), or any sub-range, or combination thereof.

Figure 4:
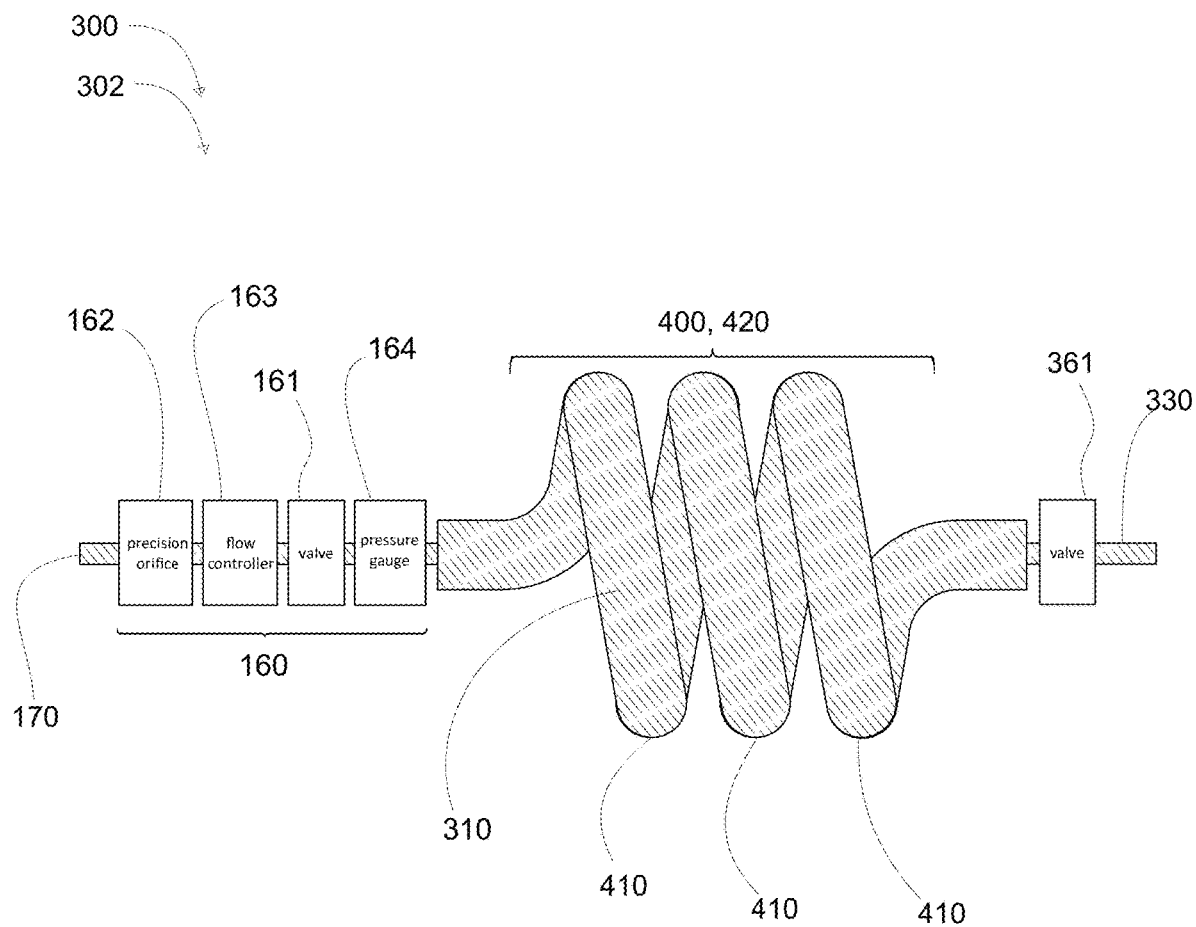
FIG. 4 is a schematic view of a high aspect ratio vacuum air sampling assembly with a coiled portion, according to an embodiment of the present disclosure.

Referring to FIG. 4, in one embodiment, a first portion 400 of the first high aspect ratio conduit 310 constituting at least 50% of the length 370 of the first high aspect ratio conduit 310 is disposed in a first coil 410, defining a first coiled portion 420 of the first high aspect ratio conduit 310. The first coil 410 may be a helical coil (shown), a non-helical coil (such as a coil having an outer boundary that is cubic, square, circular, spherical, spheroidal, or cylindrical), an irregular coil, or any bent configuration which provides a compacted overall length of the first coiled portion 420 relative to the length 370. The first coiled portion 420 of the first high aspect ratio conduit 310 may be left exposed or disposed in a first shell for support, protection, or both.

In one embodiment, the sample train 160 is at least partially housed within the first coil 410, further compacting the high aspect ratio vacuum air sampling assembly 300 and protecting the sample train 160.

Figure 5A:
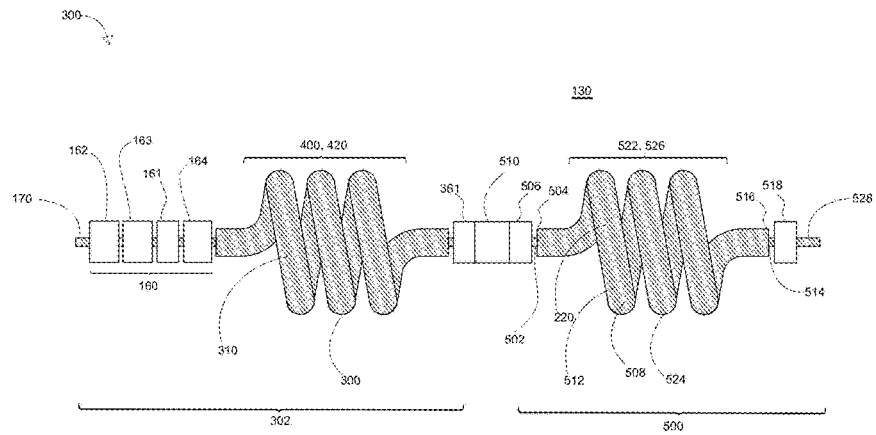
FIG. 5(a) is a schematic view of a high aspect ratio vacuum air sampling assembly with a second canister portion, according to an embodiment of the present disclosure.

Referring to FIG. 5(a), in one embodiment, the high aspect ratio vacuum air sampling assembly 300 further includes a second canister module 500. The second canister module 500 includes a second inlet 502 disposed at a second inlet end 504 of the second canister module 500. A second inlet valve 506 is attached to and in fluid communication with the second inlet 502. The second canister module 500 includes a second vessel 508 having a second internal volume 220 in fluid communication with the second inlet 502. The second inlet valve 506 is configured to attach to the first outlet valve 361 via a first union 510 disposed between the first outlet valve 361 and the second inlet valve 506 such that when the first outlet valve 361 and the second inlet valve 506 are open, the second internal volume 220 is in fluid communication with the first internal volume 120.

In one embodiment, the second inlet 502 is the sole aperture of the second vessel 508 configured for fluid communication with the external environment 130. The second vessel 508 may be any suitable vessel, such as, but not limited to, a spherical vessel, a spheroidal vessel, a cylindrical vessel, a lecture bottle, or combinations thereof.

In another embodiment (shown in FIG. 5(a)), the second vessel 508 is a second high aspect ratio conduit 512 having an aspect ratio of at least 30:1, and the second canister module 500 further includes a second outlet 514 disposed at a second outlet end 516 of the second high aspect ratio conduit 512, the second outlet 514 being in fluid communication with the second inlet 502 through the second internal volume 220 of the second high aspect ratio conduit 512, and a second outlet valve 586 attached to and in fluid communication with the second outlet, 514. The second inlet valve 506 and the second outlet valve 518 are configured to isolate the second internal volume 220 of the second high aspect ratio conduit 512 from fluid communication with the external environment 130 when the second inlet valve 506 and the second outlet valve 518 are closed. Fluid enters the second high aspect ratio conduit 512 from the first high aspect ratio conduit 310 through the second inlet 502 and exits the second outlet valve 518 through a second outlet stem 528. This fluid flow may be reversed. The first high aspect ratio conduit 310 and the second high aspect ratio conduit 512 may have the same inner and outer diameter or different inner and outer diameters.

A second portion 522 of the second high aspect ratio conduit 512 constituting at least 50% of the length 370 of the second high aspect ratio conduit 512 may be disposed in a second coil 524, defining a second coiled portion 526 of the second high aspect ratio conduit 512. The second coil 524 may be a helical coil (shown), a non-helical coil, an irregular coil, or any bent configuration which provides a compacted overall length of the second coiled portion 526 relative to the length 370. The second coiled portion 526 of the second high aspect ratio conduit 512 may be left exposed or disposed in a first shell for support, protection, or both.

The first outlet valve 361 and the second inlet valve 506 may be a mated pair of a quick-connect self-sealing valve assembly.

The first canister module 302 and the second canister module 500 may be at least partially disposed in a support carriage arranged to inhibit torsion and bending of the first union 210 via motion of the first canister module 302 relative to the second canister module 500.

Figure 5B:
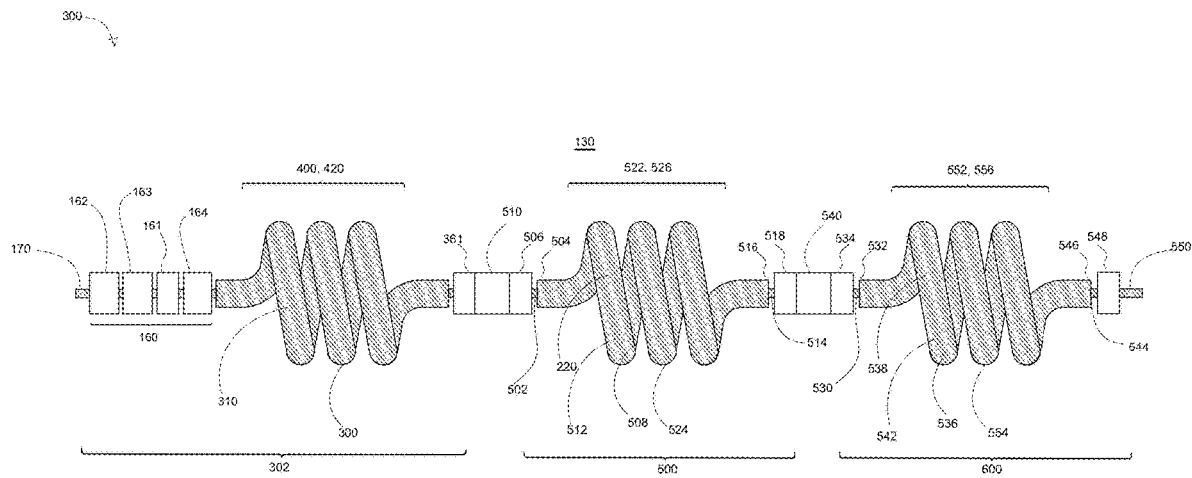
FIG. 5(b) is a schematic view of a high aspect ratio vacuum air sampling assembly with a second canister portion and a third canister portion, according to an embodiment of the present disclosure.

Referring to FIG. 5(b), the high aspect ratio vacuum air sampling assembly 300 having the second canister module 500 may further include a third canister module 600. The third canister module 600 includes a third inlet 530 disposed at a third inlet end 532 of the third canister module 600. A third inlet valve 534 is attached to and in fluid communication with the third inlet 530. The third canister module 600 includes a third vessel 536 having a third internal volume 538 in fluid communication with the third inlet 530. The third inlet valve 534 is configured to attach to the second outlet valve 518 via a second union 540 disposed between the second outlet valve 518 and the third inlet valve 534 such that when the second outlet valve 518 and the third inlet valve 534 are open, the third internal volume 538 is in fluid communication with the second internal volume 220.

In one embodiment, the third inlet 530 is the sole aperture of the third vessel 536 configured for fluid communication with the external environment 130. The third vessel 536 may be any suitable vessel, such as, but not limited to, a spherical vessel, a spheroidal vessel, a cylindrical vessel, a lecture bottle, or combinations thereof.

In another embodiment (shown in FIG. 5(b)), the third vessel 536 is a third high aspect ratio conduit 542 having an aspect ratio of at least 30:1, and the third canister module 600 further includes a third outlet 544 disposed at a third outlet end 546 of the third high aspect ratio conduit 542, the third outlet 544 being in fluid communication with the third inlet 530 through the third internal volume 538 of the third high aspect ratio conduit 542, and a third outlet valve 548 attached to and in fluid communication with the third outlet 544. The third inlet valve 534 and the third outlet valve 548 are configured to isolate the third internal volume 538 of the third high aspect ratio conduit 542 from fluid communication with the external environment 130 when the third inlet valve 534 and the third outlet valve 548 are closed. Fluid enters the third high aspect ratio conduit 542 from the second high aspect ratio conduit 512 through the third inlet 530 and exits the third outlet valve 548 through a third outlet stem 550. This fluid flow may be reversed. The second high aspect ratio conduit 522 and the third high aspect ratio conduit 542 may have the same inner and outer diameter or different inner and outer diameters.

A third portion 552 of the third high aspect ratio conduit 542 constituting at least 50% of the length 370 of the third high aspect ratio conduit 542 may be disposed in a third coil 554, defining a third coiled portion 556 of the second high aspect ratio conduit 542. The third coil 554 may be a helical coil (shown), a non-helical coil, an irregular coil, or any bent configuration which provides a compacted overall length of the third coiled portion 556 relative to the length 370. The third coiled portion 556 of the third high aspect ratio conduit 542 may be left exposed or disposed in a first shell for support, protection, or both.

The second outlet valve 518 and the third inlet valve 534 may be a mated pair of a quick-connect self-sealing valve assembly.

The second canister module 500 and the third canister module 600 may be at least partially disposed in a support carriage arranged to inhibit torsion and bending of the second union 540 via motion of the second canister module 500 relative to the third canister module 600.

EXAMPLES

Flow resistance occurs as a result of external friction between gas molecules and the wall surface and internal friction between the gas molecules themselves (viscosity). This flow resistance manifests itself in the form of pressure differences and volume flow rate, or pumping speed, losses. In vacuum technology, it is customary to use the reciprocal, the conductivity of piping L or C (conductance) instead of flow resistance W.

In general, vacuum canisters 100 include inlet stem 170 where the sampling train 160 is attached. Canister vessels 110 with low aspect ratios (e.g., a sphere having an aspect ratio of 1) do not appreciably contribute to the total flow resistance of the canister 100. A standard 1 L spherical canister 100 has a diameter of about 5 inches (12.7 cm), whereas the inlet stem 170 is commonly 0.18 inch (4.6 mm) internal diameter tubing and 2-4 inches (5.1-10.2 cm) in length. A spherical 6 L canister 100 has a diameter of about 9 inches (22.9 cm). For these canister 100 designs, the conductance of the device is limited almost entirely by the inlet stem 170 and elements of the sampling train 160. In the case where large bore tubing is employed as the vacuum vessel, there is a dimensional limit with respect to tubing length 370 and inner diameter 380 before flow resistance contributions from the tubing vessel become prohibitive.

Figure 6:
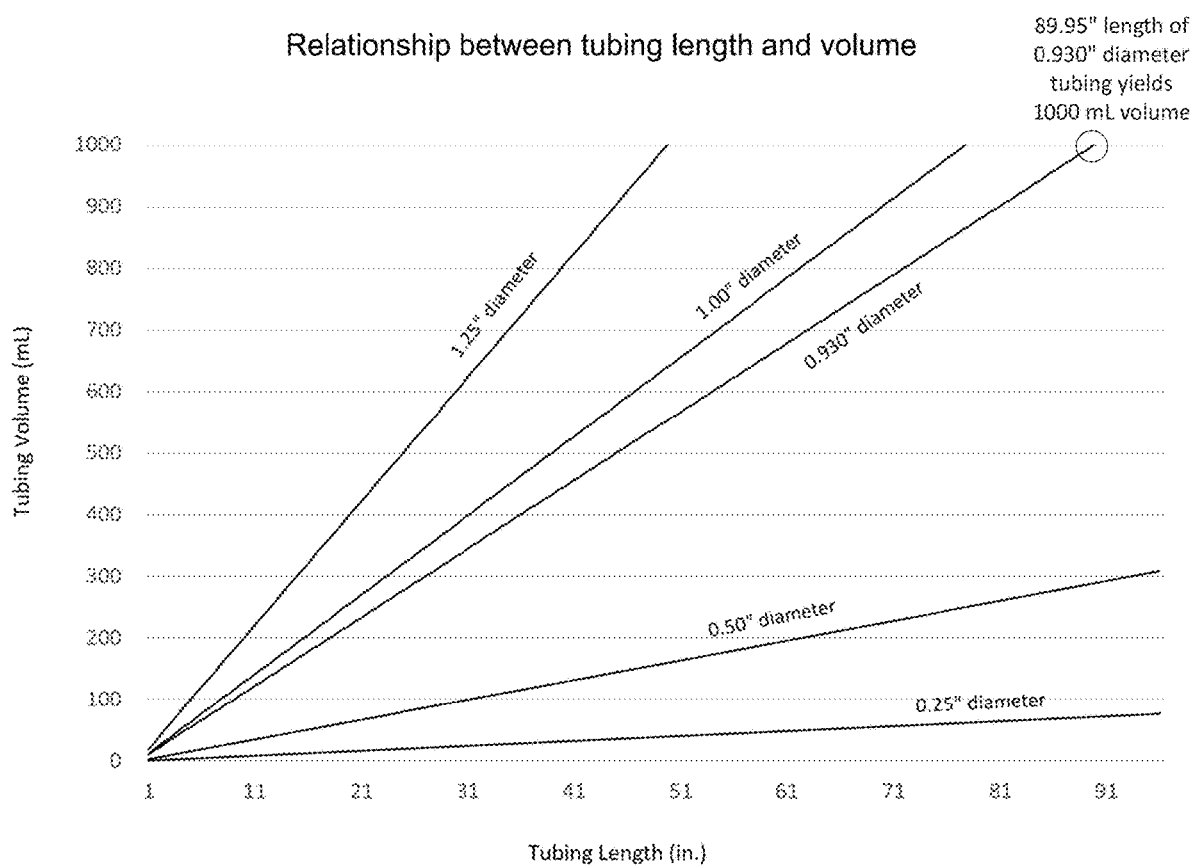
FIG. 6 is a graph comparing the relationship between tubing length and volume.
Figure 7:
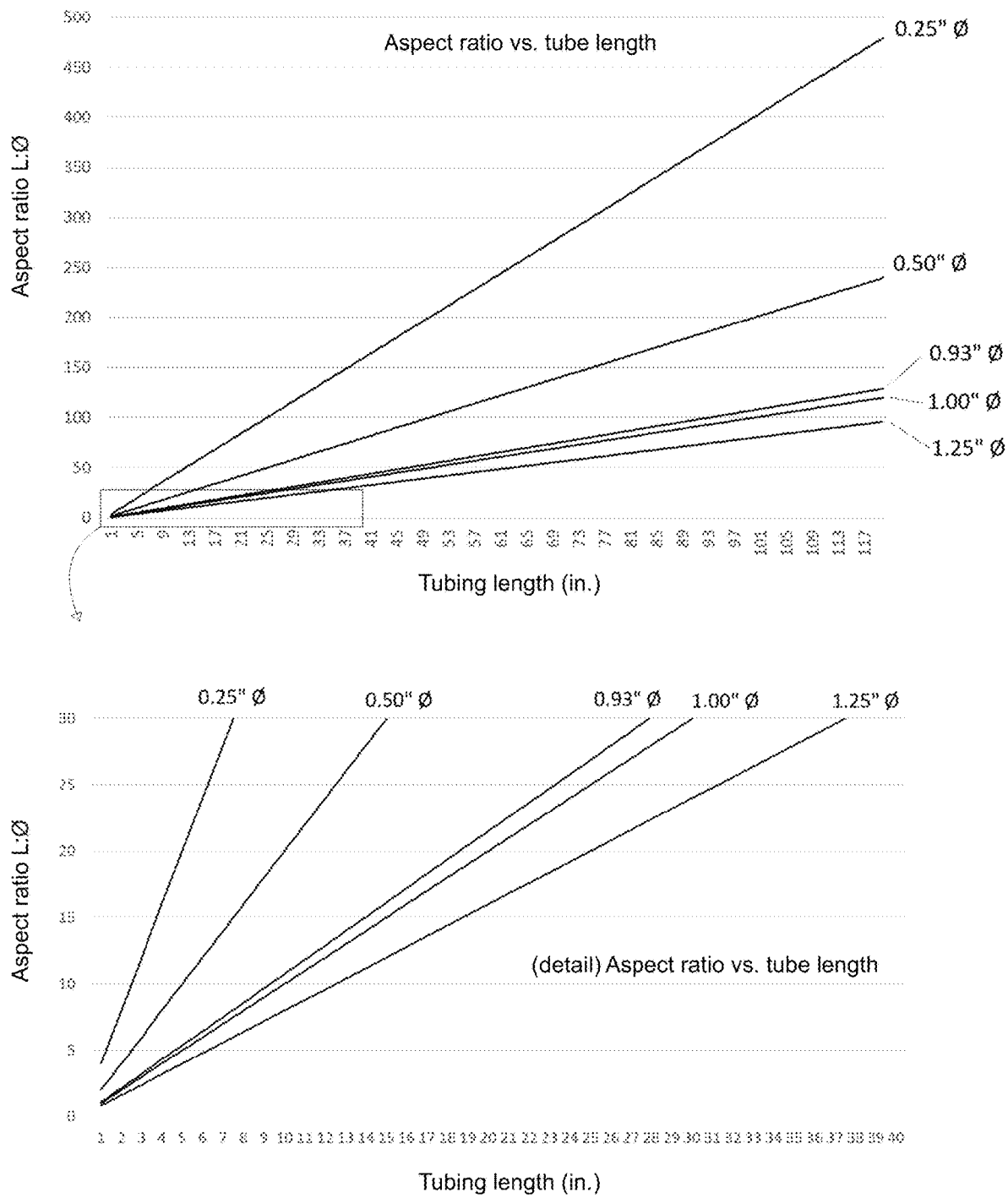
FIG. 7 is a graph comparing the relationship between aspect ratio and tube length, including an expanded view of tubing lengths between 1 inch (25.4 mm) and 40 inches (101.6 cm).
Figure 8:
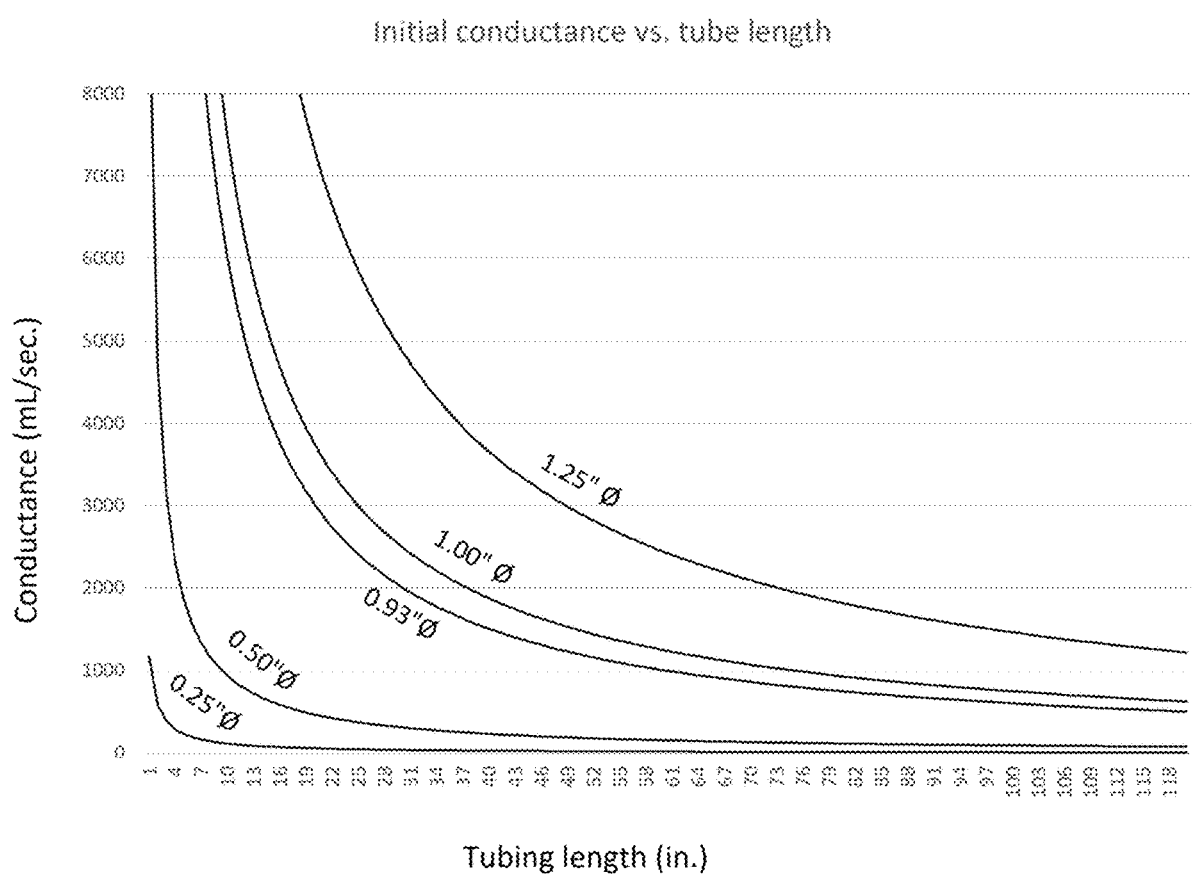
FIG. 8 is a graph comparing the relationship between initial conductance and tube length.

A simplified equation for calculating conductance in a straight tube is $C=75D^3/L$, where "C" is conductance in L/s, "D" is the tubing inner diameter in inches, and "L" is the tubing length in inches. FIG. 6 shows the relationship between tubing volume, tube diameter, and tube length, and demonstrates that a 1 L vessel may be made using a tube having an inner diameter of 0.930 inches (2.36 cm) and a length of 89.95 inches (228.5 cm). The initial conductance of a such a vessel would therefore be 067 L/s (670 mL/s or 40,200 mL/min). Inlet stems common are 0.25 inch (6.4 mm) outer diameter tubing having an inner diameter of 0.08 inches (2 mm), which, assuming a stem length of 2 inches (5.1 cm), yields a conductance of 0.219 L/s (219 mL/s or 13,140 mL/min). FIG. 8 plots the initial conductance (i.e., gas flow into a vessel at full vacuum) versus length for five tubing inner diameters.

As indicated in Table 1, a standard commercial 0.4 L canister is commonly operated between 0.5 mL/min. and 2 mL/min, a standard commercial 1 L canister is commonly operated between 0.5 mL/min. and 15 mL/min, and a standard commercial 3 L canister is commonly operated between 0.5 mL/min. and 80 mL/min. The conductance in a 1 L sampling canister made from a tube having a 0.930 inch (2.36 cm) inner diameter and a length of 89.95 inches (228.5 cm), and having a flow controller in the sampling train 160, is still limited by the sampling train 160 by well over 2-3 orders of magnitude with respect to the conductance values inherent to the tube length. As such, and surprisingly, despite the high aspect ratios of the tube, the design is suitable for vacuum canisters based on conductance criteria.

Exemplary Devices

Two smooth-bore seamless 316 stainless steel tubes, 6 feet long with 1 inch (2.54 cm) outer diameter and a 0.930 inch (2.36 cm) inner diameter, were purchased from McMaster-Carr (p/n-89785K867). Two smooth bore High Strength 2024 aluminum tubes, 6 feet (1.83 m) long with 1 inch (2.54 cm) outer diameter and a 0.930 inch (2.36 cm) inner diameter, were purchased from McMaster-Carr (p/n-1968T17). The tubes were formed into four coils using a common fabrication practice known to those in the art. Each tube was filled with sand and wound on a mandrel, resulting in an 8.25 inch (21.0 cm) coil outer diameter and a 6.25 inch (15.9 cm) coil inner diameter. The sand prevented collapsing or kinking of the tubing while being coiled. The tubing ends were trimmed and the coils cleaned with detergent and sonication. After forming the coils, the tubing volume was measured to be 750 mL. 1 inch (2.54 cm) to 0.25 inch (6.4 mm) reducing unions from Swagelok (part #SS-1610-6-4) were attached to the inlet and outlet of the tubes. 2 inch (5.1 cm) long straight stainless-steel tubes with 0.25 inch (6.4 mm) outer diameters and 0.180 inch (4.57 mm) inner diameters were applied to the 0.25 inch (6.4 mm) ends of each union as inlet and outlet stems as depicted in FIG. 3. The 316 stainless steel coils were then passivation treated with a silica-based coating (commercial name Silconert 2000 coating; SilcoTek Corp., Bellefonte, PA). 0.25 inch (6.4 mm) endcap fittings (Swagelok, (Solon, OH); p/n SS-400-C) were attached to the outlet stems of the coil vessels.

Experiment 1

Figure 9:
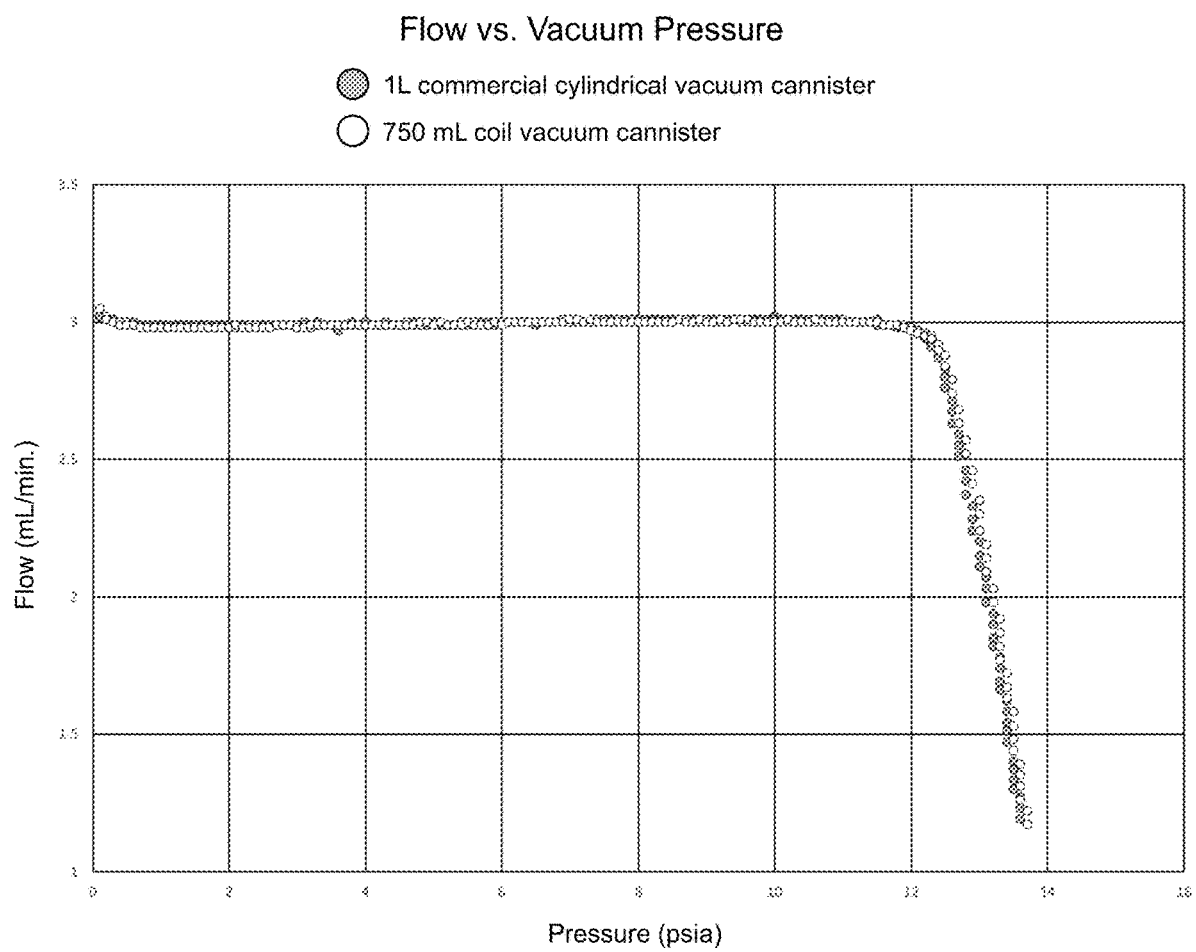
FIG. 9 is a graph comparing the relationship between flow and vacuum pressure for a 1 L commercially available cylindrical vacuum canister and a 750 mL coil vacuum canister.

Conductance of the sample gas entering the vacuum vessel was compared between one stainless steel 750 mL coil vessel design and a commercial standard 1 L stainless steel spherical vessel (1 L TO-Can Air Sampling Canisters, 3-Port RAVE Valve with Gauge, Restek Catalog #27417). To control and monitor air flow during sampling, an air sampling train was attached to the vacuum vessel inlets using quick-connect linkages to each vacuum vessel. Sampling train components were obtained from Restek Corporation (Bellefonte, PA) comprising:
Restek Catalog #27369—Female RAVEqc Valve to 0.25 inch (6.4 mm) Male Compression Fitting
Restek Catalog #27373—Male RAVEqc Valve to 0.25 inch (6.4 mm) Tube End Fitting, Short (1.23 inches (3.12 cm))
Restek Catalog #24165—Passive Air Sampling Kit (2-4 mL/min)
Restek Catalog #27330—0-50 sccm Portable Mass Flow Calibrator, Whisper Series In addition to the standard vacuum gauge, a digital data logger was purchased from Monarch Instruments (Amherst, NH) Catalog #5396-0304 and incorporated into the sample train. Both vessels were helium leak checked down to 1×10-6 mL/sec. Each sampling assembly was evacuated to 0 psi (0 kPa). Flow control was set and calibrated to 3.0 mL/min. For each assembly, the shutoff valve was then opened, and flow was measured until the vessel pressure was at equilibrium with the laboratory atmosphere. The data in FIG. 9 plots the gas flow rate entering the vessels versus the pressure measured in the vessels. A flat, linear profile is observed for both vessels up to approximately 12 psi (82.7 kPa) vessel pressure, indicating equivalent performance for both vessel designs.

Experiment 2

Figure 10:
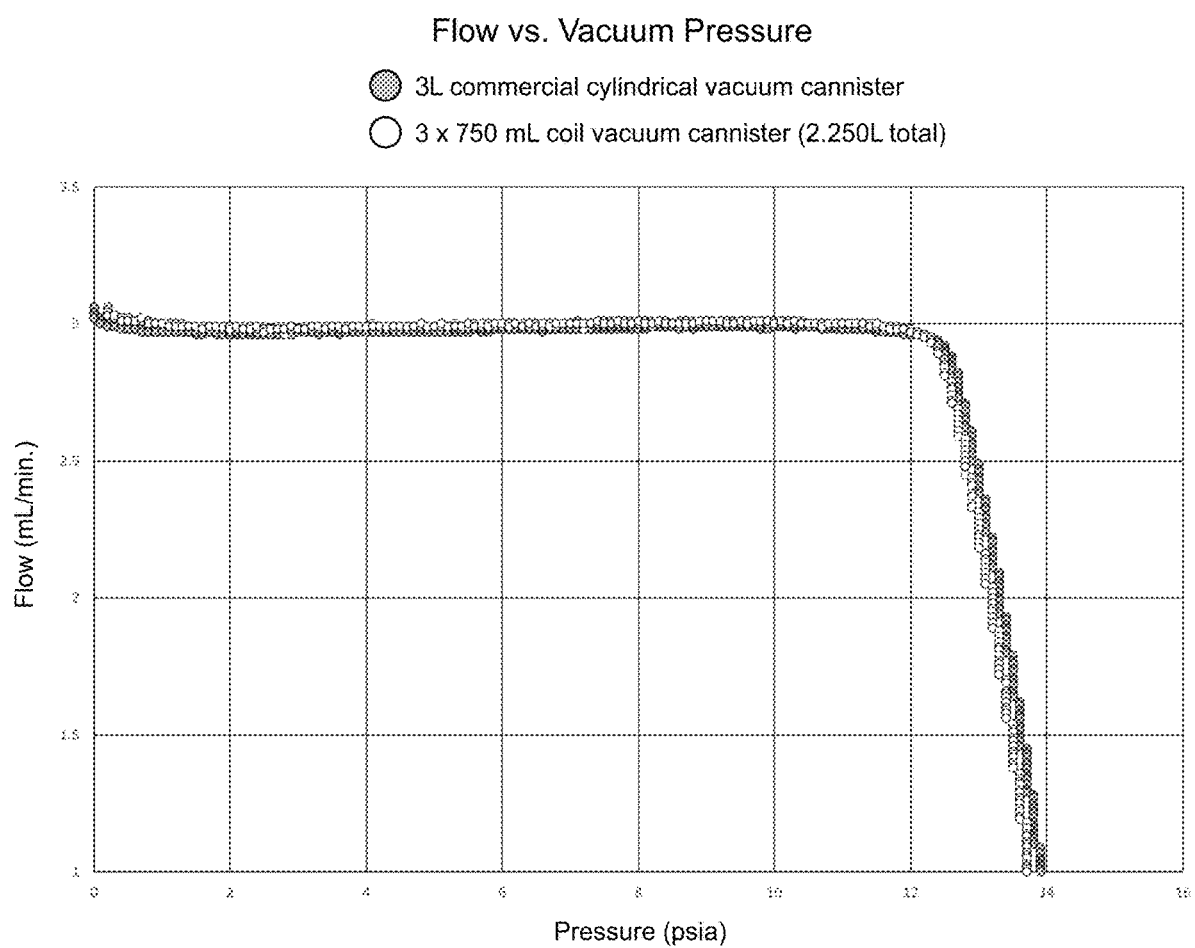
FIG. 10 is a graph comparing the relationship between flow and vacuum pressure for a 3 L commercially available cylindrical vacuum canister and 3 sequential 750 mL coil vacuum canisters (2,250 mL total).

Conductance of the sample gas entering the vacuum vessel was compared between a commercial standard 3 L stainless steel spherical vessel (Restek Catalog #27419-3 L TO-Can Air Sampling Canisters, 3-Port RAVE Valve with Gauge) and a coil vacuum vessel comprised of three 750 mL coils connected in series. For this experiment, two stainless steel and one aluminum coils were employed in the coil vessel. To control and monitor air flow during sampling, an air sampling train was attached to the vacuum vessel inlets using quick-connect linkages to each vacuum vessel. The sample train assembly is the same as that described in Experiment 1. Union connections between the three individual coil vessels employed a Quick connect RAVEqc® shutoff valve assembly (Restek Corporation, p/ns 27369 and 27373). One valve union assembly fluidically connected the outlet stem of the first coil to the inlet stem of the second coil. Another union assembly fluidically connected the outlet stem of the second coil to the inlet stem of the third coil. 0.25 inch (6.4 mm) endcap fittings (Swagelok; p/n SS-400-C) were attached to the outlet stems of the third coil vessel. Each sampling assembly was evacuated to 0 psi (0 kPa). For each assembly, the shutoff valve was then opened, and flow was measured until the vessel pressure was at equilibrium with the laboratory atmosphere. The data in FIG. 10 plots the gas flow rate entering the vessels versus the pressure measured in the vessels. A flat, linear profile is observed for both vessels up to approximately 12 psi (82.7 kPa) vessel pressure, indicating equivalent performance for both vessel designs. The data suggests the restriction points along the 3-coil series, relating to the additional inlet and outlet stems, as well as the fluidic pathways within the union connections, did not measurably influence the bulk conductance of the 3-coil assembly.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A vacuum air sampling assembly comprising a first canister module, the first canister module including:
a first conduit having an aspect ratio of at least 30:1;
a first inlet disposed at a first inlet end of the first conduit;
a first outlet disposed at a first outlet end of the first conduit, the first outlet being in fluid communication with the first inlet through a first internal volume of the first conduit;
a first outlet valve attached to and in fluid communication with the first outlet; and
an air sampling train attached to and in fluid communication with the first inlet, the air sampling train including:

a first inlet valve in fluid communication with the first inlet;
a precision orifice; and
a flow controller,
wherein the first inlet valve and the first outlet valve are configured to isolate the first internal volume of the first conduit from fluid communication with an external environment when the first inlet valve and the first outlet valve are closed; and
a second canister module, the second canister module including:
a second inlet disposed at a second inlet end of the second canister module;
a second inlet valve attached to and in fluid communication with the second inlet; and
a second vessel having a second internal volume in fluid communication with the second inlet;
wherein the second inlet valve is configured to attach to the first outlet valve via a first union disposed between the first outlet valve and the second inlet valve such that when the first outlet valve and the second inlet valve are open, the second internal volume is in fluid communication with the first internal volume.

2. The vacuum air sampling assembly of claim 1, wherein a first portion of the first conduit constituting at least 50% of a length of the first conduit is disposed in a first coil, defining a first coiled portion of the first conduit.

3. The vacuum air sampling assembly of claim 1, wherein the first conduit is a first tube having an essentially circular or essentially elliptical cross-sectional conformation along a length of the first tube.

4. The vacuum air sampling assembly of claim 1, wherein the first conduit is formed of a material selected from the group consisting of metals, glasses, quartz, polymers, and combinations thereof.

5. The vacuum air sampling assembly of claim 4, wherein a first internal surface of the first conduit is coated or chemically treated so as to reduce chemical interactions with sample analytes relative to an otherwise identical internal surface which has not been so coated or chemically treated.

6. The vacuum air sampling assembly of claim 1, wherein the first conduit has an average inner diameter of 0.18-3.0 inches (0.46-7.6 cm).

7. The vacuum air sampling assembly of claim 1, wherein the first internal volume of the first conduit is under a vacuum with a pressure of less than 1 psi (6.9 kPa).

8. The vacuum air sampling assembly of claim 1, wherein the second inlet is the sole aperture of the second vessel configured for fluid communication with the external environment.

9. The vacuum air sampling assembly of claim 1 wherein the second vessel is a second high aspect ratio conduit having an aspect ratio of at least 30:1 and the second canister module further includes:
a second outlet disposed at a second outlet end of the second conduit, the second outlet being in fluid communication with the second inlet through the second internal volume of the second conduit; and
a second outlet valve attached to and in fluid communication with the second outlet,
wherein the second inlet valve and the second outlet valve are configured to isolate the second internal volume of the second high aspect ratio conduit from fluid communication with the external environment when the second inlet valve and the second outlet valve are closed.

10. The vacuum air sampling assembly of claim 1, wherein the first outlet valve and the second inlet valve are a mated pair of a quick-connect self-sealing valve assembly.

11. The vacuum air sampling assembly of claim 1, further including a third canister module, the third canister module including:
a third inlet disposed at a third inlet end of the third canister module;
a third inlet valve attached to and in fluid communication with the third inlet; and
a third vessel having a third internal volume in fluid communication with the third inlet;
wherein the third inlet valve is configured to attach to the second outlet valve via a first union disposed between the second outlet valve and the third inlet valve such that when the second outlet valve and the third inlet valve are open, the third internal volume is in fluid communication with the second internal volume.

12. The vacuum air sampling assembly of claim 11, wherein the third inlet is the sole aperture of the third vessel configured for fluid communication with the external environment.

13. The vacuum air sampling assembly of claim 11, wherein the third vessel is a third high aspect ratio conduit having an aspect ratio of at least 30:1 and the third canister further includes:
a third outlet disposed at a third outlet end of the third conduit, the third outlet being in fluid communication with the third inlet through the third internal volume of the third conduit; and
a third outlet valve attached to and in fluid communication with the third outlet,
wherein the third inlet valve and the second valve are configured to isolate the third internal volume of the third conduit from fluid communication with the external environment when the third inlet valve and the third outlet valve are closed.

14. The vacuum air sampling assembly of claim 11, wherein the second outlet valve and the third inlet valve are a mated pair of a quick-connect self-sealing valve assembly.

15. A vacuum air sampling assembly comprising:
a first canister module including:
a first conduit having an aspect ratio of at least 30:1, a first portion of the first conduit constituting at least 50% of a length of the first conduit being disposed in a first coil, defining a first coiled portion of the first conduit;
a first inlet disposed at a first inlet end of the first conduit;
a first outlet disposed at a first outlet end of the first conduit, the first outlet being in fluid communication with the first inlet through a first internal volume of the first conduit;
a first outlet valve attached to and in fluid communication with the first outlet; and
an air sampling train attached to and in fluid communication with the first inlet, the air sampling train including:
a first inlet valve in fluid communication with the first inlet; and
a precision orifice,
wherein the first inlet valve and the first outlet valve are configured to isolate the first internal volume of the first conduit from fluid communication with an external environment when the first inlet valve and the first outlet valve are closed; and a second canister module, including:
- a second conduit having an aspect ratio of at least 30:1, a second portion of the second conduit constituting at least 50% of a length of the second conduit being disposed in a second coil, defining a second coiled portion of the second conduit;
- a second inlet disposed at a second inlet end of the second conduit;
- a second inlet valve attached to and in fluid communication with the second inlet; and
- a second outlet disposed at a second outlet end of the second conduit, the second outlet being in fluid communication with the second inlet through a second internal volume of the second conduit; and
- a second outlet valve attached to and in fluid communication with the second outlet,
- wherein the second inlet valve and the second outlet valve are configured to isolate the second internal volume of the second conduit from fluid communication with the external environment when the second inlet valve and the second outlet valve are closed, and
- wherein the second inlet valve is configured to attach to the first outlet valve via a first union disposed between the first outlet valve and the second inlet valve such that when the first outlet valve and the second inlet valve are open, the second internal volume is in fluid communication with the first internal volume.

16. The vacuum air sampling assembly of claim 15, wherein the first outlet valve and the second inlet valve are a mated pair of a quick-connect self-sealing valve assembly.

* * * * *